US005768680A

United States Patent [19]

Thomas

[11] Patent Number: 5,768,680

[45] Date of Patent: Jun. 16, 1998

[54] MEDIA MONITOR

[76] Inventor: C. David Thomas, 27041 Mill Pond Rd., Capistrano Beach, Calif. 92624

[21] Appl. No.: 435,550

[22] Filed: May 5, 1995

[51] Int. Cl.[6] .................... H04N 7/00

[52] U.S. Cl. .................... 455/2; 348/1; 348/13; 455/21

[58] Field of Search .................... 348/1, 2, 13, 467; 455/2; H04N 7/00

[56] References Cited

U.S. PATENT DOCUMENTS

| | | | |
|---|---|---|---|
| 3,733,430 | 5/1973 | Thompson et al. | 348/3 |
| 4,290,141 | 9/1981 | Anderson et al. | 455/2 |
| 4,546,382 | 10/1985 | McKenna et al. | 348/13 |
| 4,695,879 | 9/1987 | Weinblatt | 358/84 |
| 4,718,106 | 1/1988 | Wenblatt | 455/2 |
| 4,847,886 | 7/1989 | Chumley | 379/56 |
| 4,905,080 | 2/1990 | Watanabe et al. | 348/13 |
| 4,955,070 | 9/1990 | Welsh | 455/2 |
| 5,251,324 | 10/1993 | McMullan, Jr. | 455/2 |
| 5,278,988 | 1/1994 | Dejean et al. | 455/2 |
| 5,450,490 | 9/1995 | Jensen et al. | 380/6 |
| 5,457,807 | 10/1995 | Weinblatt | 455/2 |
| 5,526,427 | 6/1996 | Thomas et al. | 380/20 |

*Primary Examiner*—John K. Peng
*Assistant Examiner*—Linus H. Lo
*Attorney, Agent, or Firm*—McHale & Slavin

[57] ABSTRACT

The instant invention is an electronic audio monitor and recording device designed to be worn upon the person, in connection with audience research systems, for purposes of capturing special identifying signals embedded in audio and video programs, appending the date and time each signal is received, and recording and retaining the data until it is transferred for further processing.

6 Claims, 6 Drawing Sheets

MEDIA MONITOR

FIELD OF THE INVENTION

This invention relates to data collection for television and radio surveys and more particularly to an electronic audio monitor worn by a person for capturing television and radio embedded signals for providing audience research.

BACKGROUND INFORMATION

The need for monitoring the listening habits of an audience in response to a television or radio program is critical for purposes of soliciting sponsors which pays for the programming through advertising. Sponsorship of a program having vast audience appeal such as a Superbowl Game may cost over a million dollars for a 30 second slot. For this expense the programmers require, and the sponsors demand, assurance that the commercials reach the appropriate audience.

Determining whether an advertisement reaches the appropriate audience is a science wherein research companies perform statistical studies to predict audience size, age, spending habits, and so forth. The accuracy of the prediction is critical both to the reputation of the research company and the budget of the advertiser.

Proper research requires not only detailed information of when a person is watching a particular program but a correlation to the person's viewing preference which is assimilated into a representative audience to form the basis of a survey.

The problem with obtaining the data for such surveys is that the collection is based upon human interface through a form of data capture. Conventional research requires a person who is believed to represent a segment of the population to fill out a diary or input information into personal identification devices which are then transferred to a main collection location for processing.

A problem exists in that the audience research for television and radio must take on separate recordation techniques. For example, a majority of the radio listeners are found in the automobile where the radio provides the preferred form of entertainment and information while an individual commutes to work. In such instances, filling out of a diary is difficult and dangerous leading to inaccurate data accumulation and defeating the primary purpose of the research. Alternatively, television is typically viewed while sitting in the comfort of a person's home, yet with the advent of remote control and the proliferation of programs currently available for viewing by the public, a phenomena referred to as channel surfing has alleviated basic research techniques, for a viewing party may be watching a particular television show and switch to another show during commercials. Many televisions allow simultaneous viewing of two programs by use of picture in a picture. Thus, the sponsor of the show no longer has the confidence that his commercial is being directed to the desired audience even if a particular show is recorded as being watched.

For this reason, numerous attempts have been made to perfect this basic research situation to assist a researcher in accumulation of data on how a sampling of the audience reacts to a particular program and whether the audience sampled actually watches the commercial advertisement or just the program.

U.S. Pat. No. 4,955,070 discloses an electronic monitoring system for automatically monitoring broadcast band listening habits and periodically collecting data at a central location. The invention discloses the use of a microphone or acoustic sensor to enable the electronic monitor to detect earphone type listening. During operation a panel is carried wherein the microphone detects the audio frequency acoustic energy which is digitized to convert the signal in the algorithm which is used to determine a station match to ensure accurate monitoring.

U.S. Pat. No. 4,695,879 discloses a television viewing meter for monitoring the viewing habits of individuals. In this disclosure a stationary monitoring unit is provided which interfaces with a portable monitoring unit designed to be worn around the head of an individual to be monitored. A transmitter focuses signals from the head wearer to the receiver, emitting an activating signal only when the individual wearing the head wear is looking directly at the television set. This device simply determines when an individual is looking at a television and does not determine which channels the individual may be watching.

U.S. Pat. No. 4,905,080 discloses a data collection apparatus for use in research of television audiences. The data collection device includes a channel selector for detecting a television channel being viewed and a personal data entry device for storing and processing entered data. The device requires the use of a keyboard to enter various data in order to obtain market research.

U.S. Pat. No. 3,733,430 discloses a channel monitoring system which interprets FM frequency transmissions through a trunk cable at remote television sites. This device is suited for monitoring pay television billing in which a company can determine whether or not the consumer is watching a particular pay television show by scanning of the FM transmission allowing the appropriate billing.

U.S. Pat. No. 5,251,324 discloses a method and apparatus for generating and collecting viewing statistics in a cable television system in which television related data may be generated at each remote terminal and collected by a single system manager. This device is limited to use with cable television with an objective of transmitting channel viewing for purposes of billing.

U.S. Pat. No. 4,546,382 discloses a television and market research data collection system having a remote unit attached to a television receiver which need not be attached directly to a cable system. The remote unit determines T.V. mode of operation in a video message for the T.V. viewer, such as a survey which may be transmitted from the central location and stored at the remote unit for display on the T.V. receiver for interpretation by the T.V. viewer. This device requires operation on behalf of the T.V. viewer to input the appropriate viewing materials.

U.S. Pat. No. 5,278,988 discloses a method and apparatus for determining a particular transmitting station from which program signals are received and translated by a monitor receiver within a test area having mobile receivers. A tuned frequency of the monitored receiver is identified in the particular transmitting station corresponding to the identified tune frequency which is identified responsive to both the identified tune frequency of the monitor receiver and stored transmitter characteristic table. The invention requires the monitor and receiver to have the ability to detect which tuned frequency is being received by determination of the interpreting data base.

Thus, what is lacking in the art is an identification system requiring ho intervention at the data collection level by the use of source television and radio programming.

SUMMARY OF THE INVENTION

The instant invention is an electronic audio monitor and recording device designed to be worn upon the person, in connection with audience research systems, for purposes of capturing special identifying signals embedded in audio and video programs, appending the date and time each signal is received, and recording and retaining the data until it is transferred for further processing.

The apparatus and device includes a miniaturized audio receiver capable of receiving audio signals produced by radio, television, and computer speakers, digitizing the signal received (via an integral microprocessor), appending a digital time-stamp (from an internal clock), and storing the data in on-board solid-state memory. The device also has provisions for transfer of accumulated data records from memory to a data retrieval system for subsequent transmission via communications' common carriers to central data processing and reporting systems.

The device may be approximately the size of a pager, and may ultimately be concealable within a wristwatch housing or other items of personal jewelry such as belt buckles, necklace pendants, bracelets, etc. so that the device may be worn without drawing attention to itself.

The device makes it possible to collect data on both television viewing and radio listening with the same device and from the same sample of respondents, if desired. In general a pre-arrangement can be made wherein each source of television or radio programming that is to be measured is assigned an identification signal that uniquely identifies the source. Successive levels of a programming distribution system may be assigned unique identification signals, e.g. networks, stations, cable systems, etc. so that the program received at the particular level can be identified not only by its local source but also by its originating source and by intermediary distribution systems.

Each program source causes its identification signal to be inserted into the outgoing programming stream at predetermined intervals, e.g. every fifteen minutes. Systems at downstream distribution levels detect identification signals from upstream sources and automatically append their own identification signals.

The identification signal is a series of tones in the frequency range reproducible by speakers in radio and television sets sold in the United States, uniquely coded to identify each program source participating in the system of audience research.

If persons wearing the device are within the sound of television or radio programming containing identification signals, their receivers automatically detect and record such signals, appending time stamps to each. At intervals, by pre-arrangement, data stored in memory is transferred to a data retrieval system for uploading to central processing facilities via communications' common carriers.

Thus, an objective of the instant invention is to disclose a portable audio monitoring device to be worn upon a person to detect identification signals inserted into a broadcast at the source, which such signals specifically identify the source of the program, the program itself, and commercial announcements contained in the program.

Another objective of the instant invention is to provide commercial ratings to make possible contextual research on audience behavior, enabling analysis of how audiences tune into, stay with, or turn away from commercials as a function of individual commercial content and of surrounding programming or commercials.

Still another objective of the instant invention is to provide audience research that is less expensive, flexible, and more reliable than existing audience research systems.

Yet still another objective of the instant invention is to allow the same sample and data collection methodology for all forms of audience research, including television, radio, cable, STV, MDS, videocassette, and other emerging distribution systems providing data that is strictly comparable across media types.

Still another objective of the instant invention is to provide a system that does not require a dedicated telephone line or expensive interface with a television or radio, reducing the incentives paid to respondents for work performed, if not eliminating the incentives. The device does not require installation and makes it possible to use a single sample for all forms of audience research, eliminating the duplicated costs of convention systems.

Yet still another objective of the instant invention is to provide a media venue that includes the home, car, barber shop, office and so forth allowing an individual to be monitored throughout the day, eliminating the need for separate methodologies presently used to measure an audience.

Another objective is to empanel a more representative sample for audience research with a consequent improvement in the reliability of audience estimates by use of a passive system that can be used by a wider cross-section of the population, who may have different lifestyles or diverse languages.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
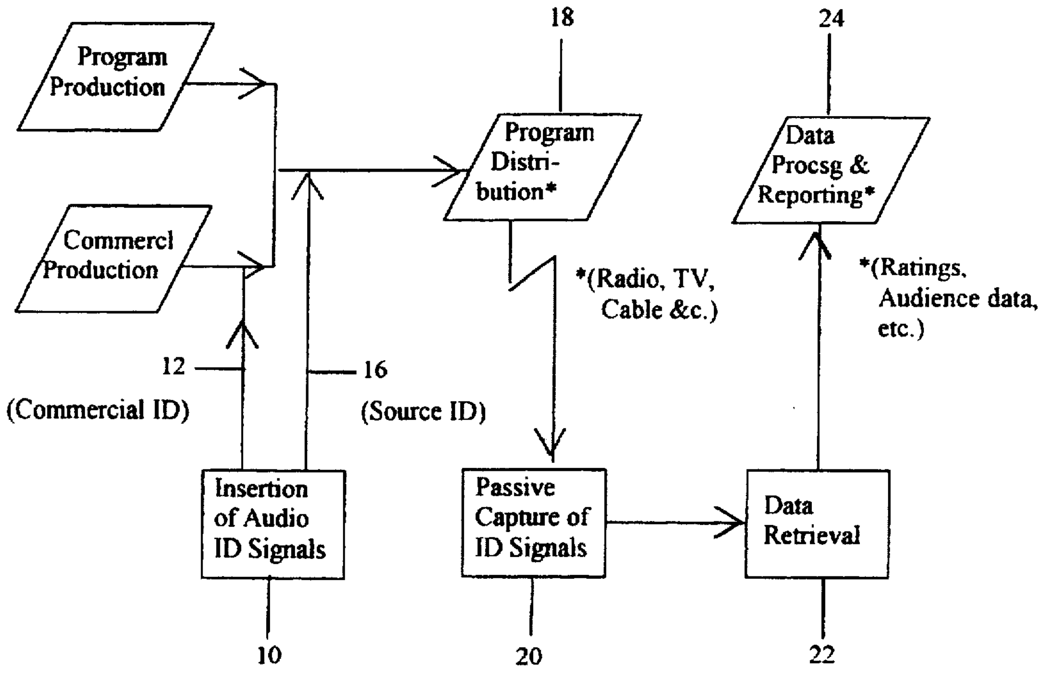
FIG. 1 is a block diagram illustrating an overview of the apparatus and process of the instant invention.

Now referring to the flow chart depicted as FIG. 1, the audience research begins with insertion of audio identification signals 10 into an outgoing stream of a commercial or program production 12 programming followed by a source identification input 16 at a radio or television source 18 at prearranged intervals. These signals are captured passively by audience research panel respondents wearing a media monitor 20 which comprises: a receiver for detecting coded audio tones transmitted by a television or radio, a signal processor for converting the audio tones into a digitized signal, a device for appending a digital time stamp to the signal, a memory for storing data corresponding to the coded and stamped signal, and a rechargeable power supply. Periodically, by prearrangement, respondents place their receivers in a data retrieval system 22 for uploading of accumulated data records to central data processing and reporting systems 24 operated by an audience research service.

Figure 2:
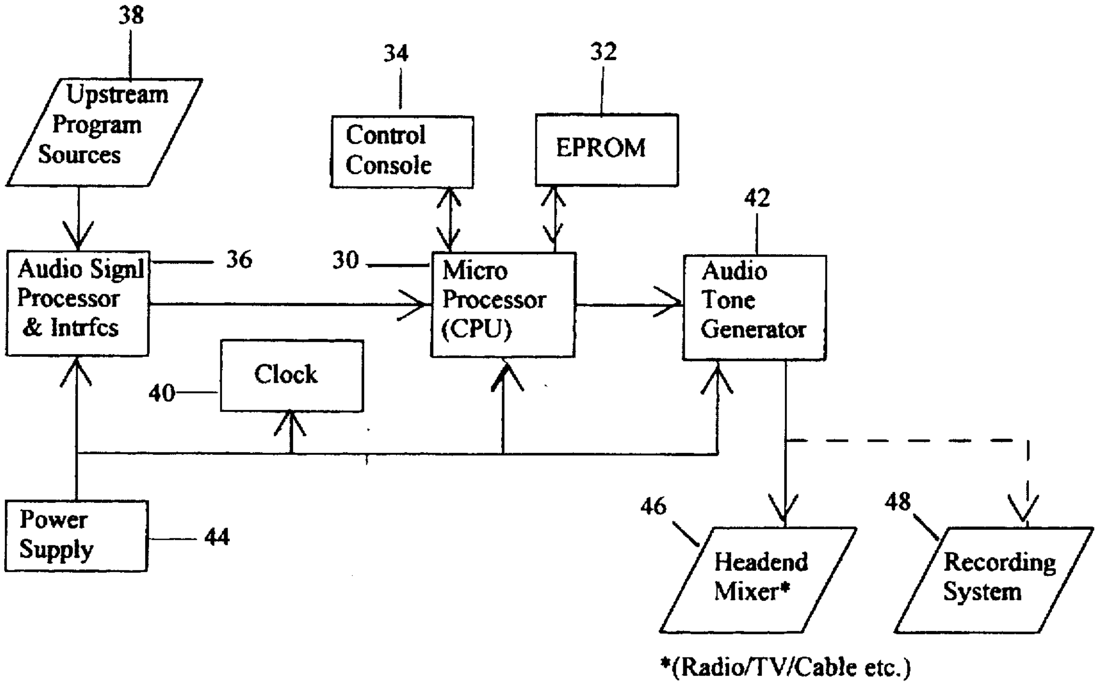
FIG. 2 is a block diagram illustrating an overview of signal insertion.

As shown in FIG. 2, signal insertion is performed of pre-programmed source identification signals into outgoing programming at the originating studio level of the broadcasting system or at the head-end level of cable system, and optionally to insert pre-programmed commercial identification signals into tapes of commercial executions. The system includes a microprocessor 30 which operates as the CPU for overall system having a 32 EPROM from which pre-programmed identification signals are extracted as needed. A control console 34 is used for system operation and commercial ID insertion procedures. The audio signal processor 36 provides for detection and processing of identification signals embedded in programming received from upstream sources and associated interfaces to upstream broadcast, satellite, or wireline sources 38. A real time digital clock 40 is used to time signal insertion intervals with an audio tone generator 42 to generate outgoing tonal signals. Power supply 44 supports the system. The audio tone generator 42 provides tonal outputs to a studio or headend mixer 46 that merges the source identification signal with outgoing program signals. Optionally, the audio tone generator may be connected to a recording system 48 for insertion of commercial identification signals.

Figure 3:
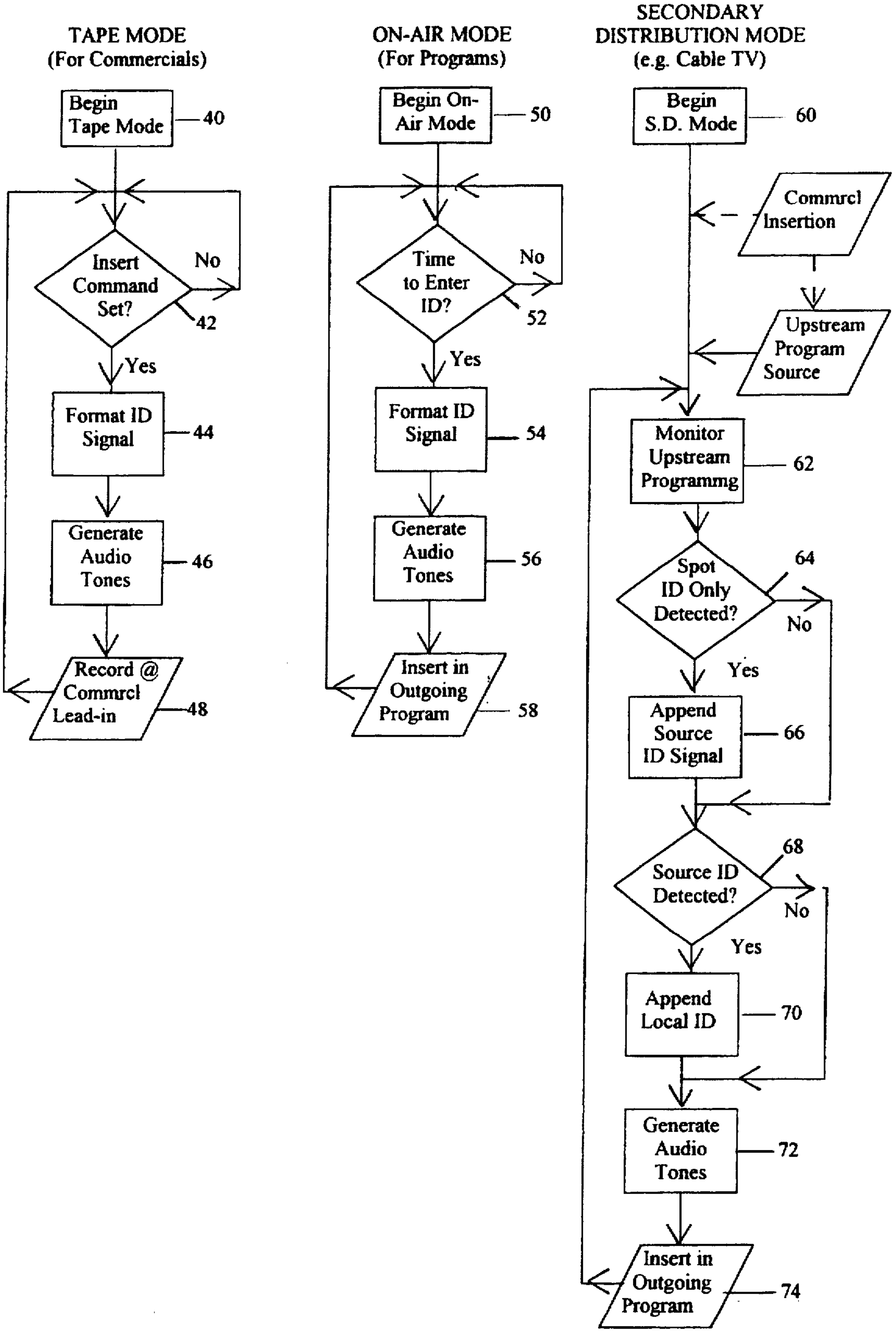
FIG. 3 is a block diagram illustrating the three embodiments of signal insertion.

FIG. 3 sets forth primary modes for insertion of identification signals: tape mode for inserting identification signals into commercial executions; on-air mode to insert source identification signals into outgoing programming in real time; and secondary distribution mode used at downstream redistribution levels such as cable systems, nodes on satellite networks, and so forth.

In the tape mode 40, the system checks for an insertion command from the console 42 and, if present, retrieves the YAAAAA portion of the next available pre-programmed commercial identification signal from the system's read-only memory. It then formats the full BYAAAAACE signal 44 and passes it to the audio tone generator 46 which outputs the corresponding tone series to the attached recording system at the appropriate lead-in mark 48. The result is that a unique commercial identification signal is attached to the lead end of the commercial track and becomes a part of that commercial.

In the on-air mode 50, the system checks for the arrival in real time of a pre-scheduled signal 52 insertion interval (e.g. every fifteen minutes). At the appropriate time, the system retrieves the pre-programmed source identification signal from ROM, formats the signal in the BTSSSSCE format 54 and passes the signal to the audio tone generator 56. The audio tone generator 56 outputs the corresponding tone series to a studio or headend mixer 58 that merges the source identification signal with outgoing program signals.

In the secondary distribution mode 60 (e.g. cable television, where the signal insertion system would operate at the headend of the local cable system, receiving programming from off-air broadcasts, satellites, and/or wireline sources), the system monitors programming arriving from upstream sources 62. If a commercial identification signal is detected with no source identification attached 64, the system can be programmed to append the appropriate source identification signal 66 from ROM. The system can also be programmed to append the local distribution source identification to the primary source identification 68 whenever a source identification signal is received from an upstream source. This generates a signal 70 with the format TSSSSCTDDDDCD, where DDDD is the unique identifier of the local distribution system. This option allows programming or commercials to be credited to all intermediate distribution systems (e.g. local broadcast stations, local cable systems) as well as to the primary source (e.g. a network) in the audience statistics compiled by the audience research service. Once the complete signal series has been formatted, the system passes it to the audio tone generator 72 which outputs the corresponding tone series to a studio or headend mixer 74 for insertion into outgoing programming.

The operation of the audio insertion device is based on a production of a series of tones in the frequency range reproducible by speakers in radio and television sets. The tones can be in a frequency range that cannot be heard by the human ear. These tones are arranged in a number of ways to form a unique identifying signal. For example, to identify a program source (e.g. a television network, a radio station, etc.), a signal of the following form might be used:

BTSSSSCE, where:

B=BEGIN code (a unique character used only for this purpose)

T=TYPE code, e.g.
- A=AM Radio
- B=FM Radio
- C=UHF Television
- D=VHF Television
- E=Cable origin etc.

SSSS=SOURCE code (four alphabetic characters uniquely identifying the source, probably the station call letters or an equivalent ID assigned by the audience research service)

C=CHECK character, an algorithmic value computer from SSSS, used to validate the received signal E=END character (a unique character used only for this purpose)

For unique identification of commercials or programs, the signal might be expanded as follows:

BY AAAAACE, where:

AAAAA=unique alphabetic code assigned to a specific commercial execution or program Y=Code value in a designated alphabetic range (e.g. N to Z), each letter representing a calendar year. This scheme allows nearly 12 million unique commercial identifications to be assigned each year.

B,C, and E are defined for source identification signals, earlier.

The characters used in the BTSSSSCE and BYAAAAACE coding schemes would be the English alphabet characters from A to Z plus the unique begin and end codes and possibly other special codes. The actual codes will be developed through research and experimentation, but an example of a possible code would be a

| Binary-Coded Alpha scheme, as follows: | | | |
|---|---|---|---|
| (1=On, or Dash, or Tonal Value A; 0=Off, or Dot, or Tonal Value B) | | | |
| 10000=A | 10001=B | 10010=C | 10011=D |
| 10100=E | 10101=F | 10110=G | 10111=H |
| 11000=I | 11001=J | 11010=K | 11011=L |
| 11100=M | 11101=N | 11110=0 | 00001=P |
| 00010=O | 00011=R | 00100=S | 00101=T |
| 00110=U | 00111=V | 01000=W | 01001=X |
| 01010=Y | 01011=Z | 11111=BEGIN | 00000=END |

This code can be transmitted aurally, as indicated, by using a long (dash) tone to represent the binary 1 and a short (dot) tone to represent binary 0. Or, binary 1 could be represented by a tone at a given standard frequency and binary 0 by a tone at a different (higher or lower) standard frequency, sufficiently separated to assure reliable discrimination within the apparatus. It is noted that other schemes of coding and aural representation are possible, which are obvious to one of ordinary skill in the art and deemed within the scope of this invention.

An embodiment of the apparatus is to measure the audience for specific commercials. To implement this embodiment, unique identifying signals would be inserted into specific commercials before they are distributed by broadcast or other media. This scheme would also support fully-automated services for commercial verification and for summaries of advertising buys by advertiser and media.

Figure 4:
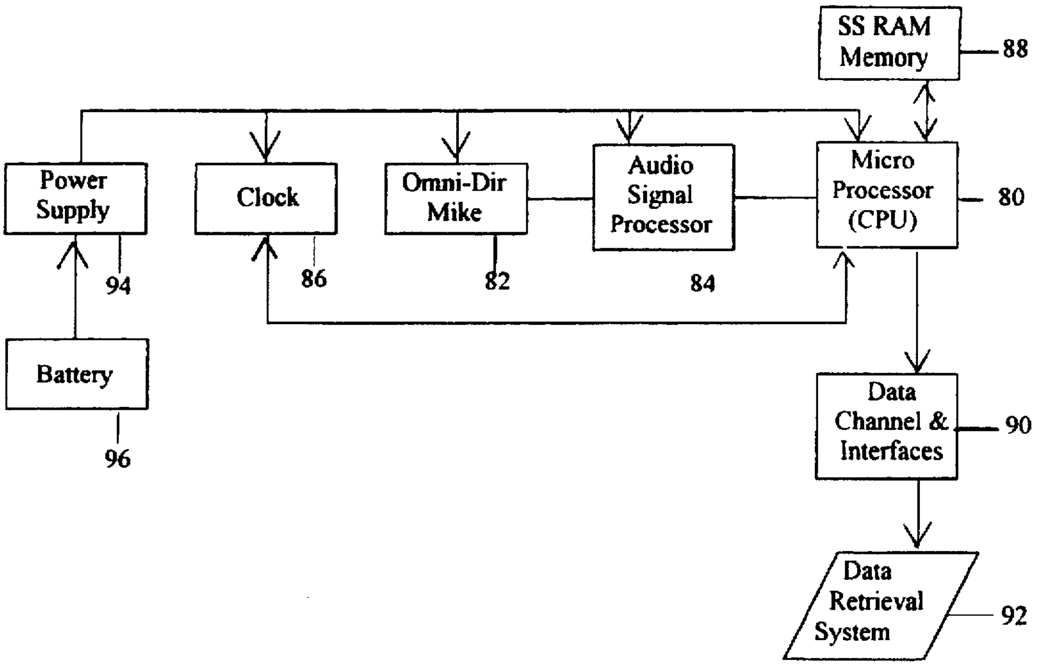
FIG. 4 is a block diagram illustrating the data capture device.

Referring to FIG. 4, the receiver is the basic component of the apparatus, being a miniaturized device worn upon the person for purposes of detecting and recording identification signals embedded in the programming and commercials that are audible to the respondent wearing the device. Its functional components include a microprocessor 80 which serves as CPU for overall receiver. An omni-directional microphone 82 with sensitivity sufficient to detect speaker output from radio or television sets at or above a specified threshold volume is coupled to an audio signal processor 84 which processes the audio tones received from the microphone and generates a corresponding digitized signal. A digital real-time clock takes a time and date to be appended to incoming identification signals. Solid state random access memory 88 stores the formatted and time-stamped records of identification signals until they are periodically uploaded for further processing. Data channel and interfaces 90 are periodically uploaded to the data retrieval system 92. Power supply 94 is a rechargeable battery 96.

Figure 5:
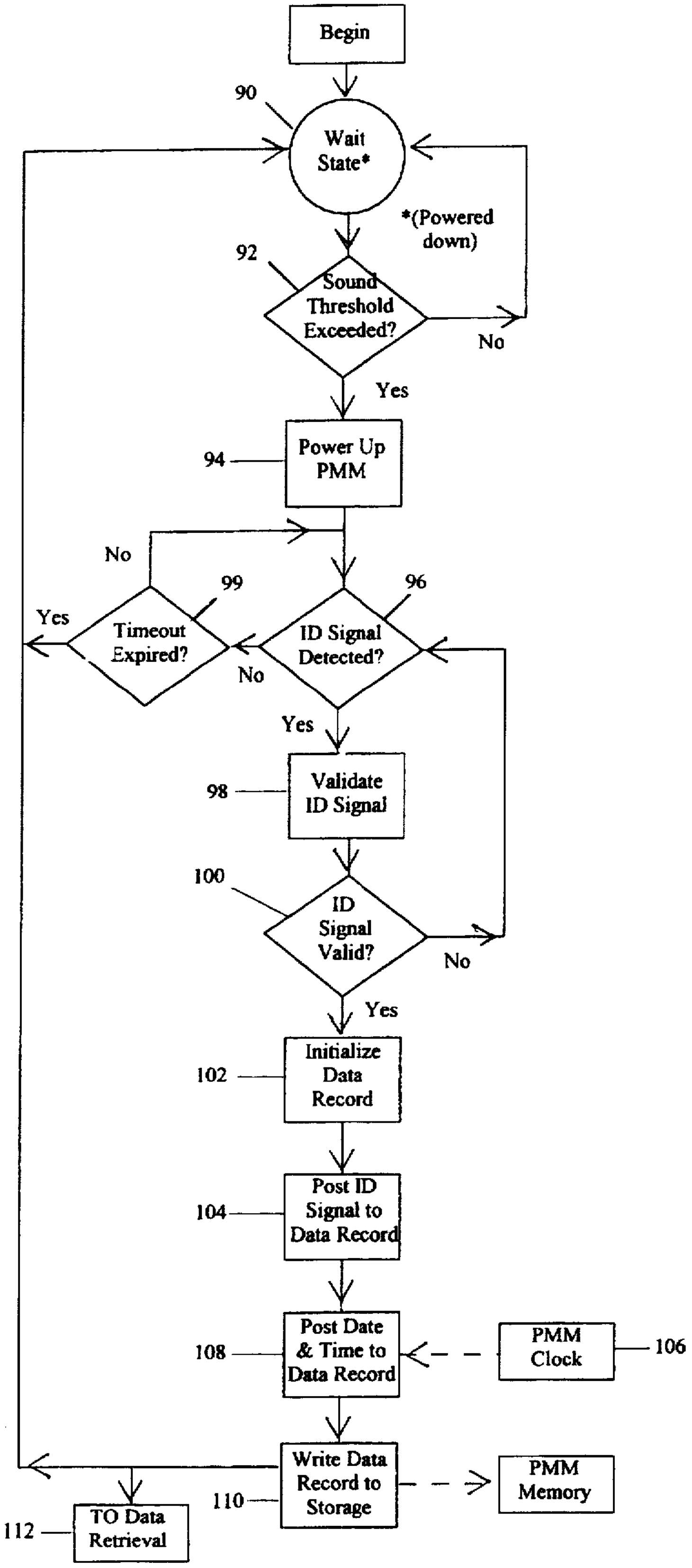
FIG. 5 is a block diagram illustrating the data capture process.

FIG. 5 sets forth the basic process whereby a receiver worn by an audience research respondent monitors the respondent's aural environment and detects, processes, and records signals identifying programming and/or commercials entering that environment. To conserve battery power, the device would operate in a powered-down wait state 90 until it receives sound exceeding a predetermined threshold 92, whereupon the entire system would be powered up 94. The program calls for monitoring to continue until either an identification signal is detected 96 or a predetermined timeout interval is reached 99. In the latter circumstance, the system powers down and re-enters the wait state 90. When sounds having the characteristics of an identification signal are detected 96, the system applies a validation routine, which checks the formal and tonal values for correspondence to standards. It also calculates a check digit for the TSSSS or YAAAAA portions of identification signals received, using the same algorithm by which such check digits were originally assigned 98 and compares the computed value to the received value 100. If these agree, and if all other validation checks are in order, the system then formats a data record 102 and posts the identification signal to this record 104.

The system then retrieves the data and time of day from an internal electronic clock 106 and posts it to the data record 108. The system then writes the completed data record 110 to the receiver's solid state memory, where it is retained until passed on to the data retrieval system 112.

Figure 6:
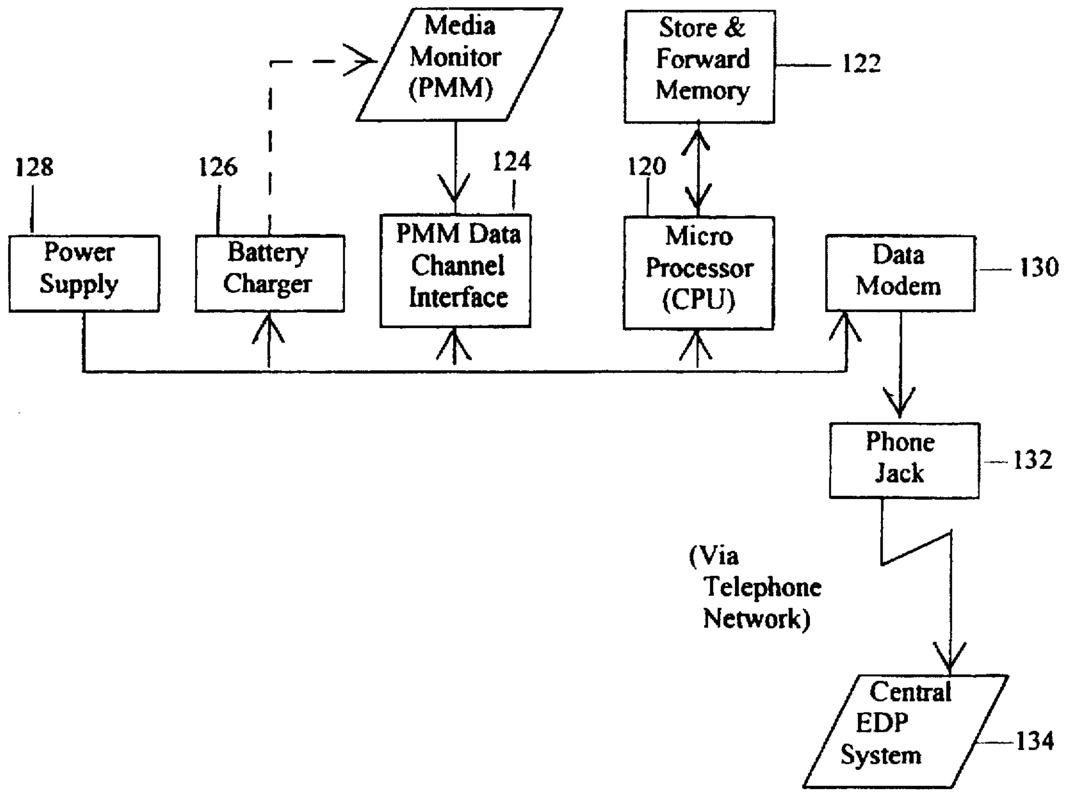
FIG. 6 is a block diagram illustrating the data retrieval device.

Shown in FIG. 6 is the data retrieval system. The functional structure of the data retrieval system consists of a microprocessor 120 which functions as the controlling CPU in the data retrieval process; store-and-forward memory 122 in which data records from the receiver are stored; a set of interfaces 124 with the electrical and electronic components of the device, including its data channel; a battery charger 126 used to recharge the receivers on-board battery 128; and a data modem 130 and telephone jack 132 used to connect the system to common carrier communications systems for transmission of receiver data records to central processing systems 134 operated by audience research services.

Figure 7:
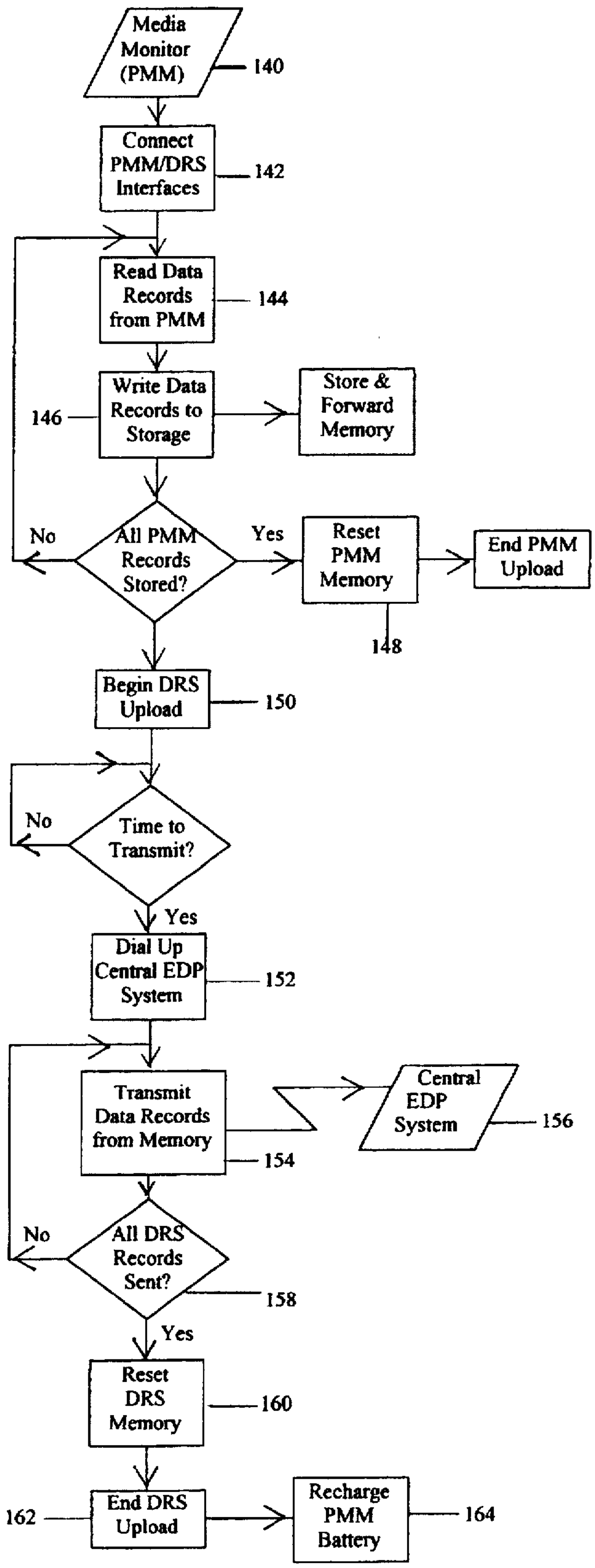
FIG. 7 is a block diagram illustrating the data retrieval process.

FIG. 7 illustrates the process of the data retrieval which provides an overnight resting place for the receiver. The data retrieval system is connected to a household power source and the system's telephone jack connected to the household's telephone system using a jack splitter. Respondents would be instructed to wear their receivers at all times except that when retiring to bed, the receiver is to be placed in the data retrieval system 140 where contacts are provided that connect the receiver and interfaces 142. As the respondent sleeps, the data retrieval system recharges the battery and retrieves all data records present in the receiver's memory. Under control of the data retrieval system program, the system may also dial up a control processing system and transmit accumulated data records. Upon connection of the data channel, the data retrieval system reads all of the data records contained in the solid state memory 144, then writes these records into the store-and-forward memory on board the data retrieval system 146. When all records present in memory have been stored in data retrieval system memory, the system resets memory 148, ending the upload phase of the process.

At a time predetermined by the data retrieval system the control program begins the upload phase 150. The system dials 152 up the central processing system at the audience research service and transmits accumulated data 154 records from its store-and-forward memory to the central EDP system 156. When all accumulated records have been received by the central system 158, the data retrieval system resets 160 its store-and-forward memory 162. Finally, the system recharges the on-board battery 164.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification. CLAIMS

What is claimed is:

1. An electronic audio monitor and recording apparatus, said apparatus comprising:

self contained portable receiver means carried by an individual for detecting a coded audio signal transmitted at a frequency not detectable by the human ear by multiple television or radio broadcasts delivery at various locations;

signal processor means for converting said audio signal into a digitized signal;

means for appending a time stamp to said digitized signal;

means for storing data corresponding to said digitized signal;

a rechargeable power supply a means for coding signals for transmission in a television or radio broadcast comprising; a computer means having an EPROM and a real-time digital clock with pre-programmed identification signals; an audio tone generator operatively associated with said computer means for producing a series of tones for identifying a program source defined as a first tone for indicating transmittal, a second tone for indicating program type, a third tone for indicating program source, a forth tone for indicating validating said digitized signal, and a fifth tone for ending of transmittal and placing said receiver into a wait state mode in correspondence to said identification signals for placement in said program, said forth tone is compared to a algorithmic value to determine whether said third tone is a program source to be recorded; and a means for insertion of said series of tones into a television or radio signal.

2. The apparatus according to claim 1 wherein said series of tones are predefined to identify a program source and identification of a commercial played by said program source.

3. The apparatus according to claim 1 wherein said pre-programmed identification signals is further defined as a series of tones for identifying a program defined as a first tone providing a binary coded alphabetic code assigned to a specific commercial execution or program, a second tone for providing a binary coded alphabetic code to represent a calendar year, a third tone for indicating program source, a forth tone for indicating validating said signal, and a fifth tone for ending of transmittal and placing said receiver into a wait state mode.

4. The apparatus according to claim 1 including a support structure for placement of said receiver means comprising:

a means for retrieving said data;

means for transferring said retrieved data to a remote central computer.

5. The apparatus according to claim 4 wherein said means for transferring said retrieved data is further defined as telephone interface having a modem transfer of accumulated data to said central computer.

6. The apparatus according to claim 1 wherein said support structure includes a means for recharging said rechargeable power supply.

* * * * *